(12) United States Patent
Kim

(10) Patent No.: US 10,604,106 B2
(45) Date of Patent: Mar. 31, 2020

(54) SAFETY BELT DEVICE FOR VEHICLE

(71) Applicants: Hyundai Motor Company, Seoul (KR); Kia Motors Corporation, Seoul (KR)

(72) Inventor: Dae Woon Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 34 days.

(21) Appl. No.: 16/156,119

(22) Filed: Oct. 10, 2018

(65) Prior Publication Data

US 2019/0344747 A1 Nov. 14, 2019

(30) Foreign Application Priority Data

May 11, 2018 (KR) .................. 10-2018-0054180

(51) Int. Cl.
| | |
|---|---|
| *B60R 22/22* | (2006.01) |
| *B60R 22/20* | (2006.01) |
| *B60R 22/195* | (2006.01) |
| *B60R 22/48* | (2006.01) |
| *B60R 22/19* | (2006.01) |
| *B60R 22/26* | (2006.01) |
| *B60R 22/00* | (2006.01) |

(52) U.S. Cl.
CPC .......... *B60R 22/195* (2013.01); *B60R 22/001* (2013.01); *B60R 22/19* (2013.01); *B60R 22/26* (2013.01); *B60R 22/48* (2013.01); *B60R 2022/1957* (2013.01); *B60R 2022/4808* (2013.01)

(58) Field of Classification Search
CPC .... B60N 2/4228; B60N 2/688; B60N 2/4235; B60N 2/433; B60R 22/26; B60R 21/207; B60R 2022/1818; B64D 11/06; B64D 11/062

See application file for complete search history.

(56) References Cited

U.S. PATENT DOCUMENTS

| | | | |
|---|---|---|---|
| 3,556,584 A | * | 1/1971 | Lewis .................. B60N 2/4221 296/68.1 |
| 4,213,637 A | | 7/1980 | Mauron |
| 5,236,220 A | * | 8/1993 | Mills ...................... B60R 22/22 280/801.1 |

(Continued)

FOREIGN PATENT DOCUMENTS

KR   20-1999-0011240 U   3/1999

*Primary Examiner* — Shin H Kim
(74) *Attorney, Agent, or Firm* — Morgan, Lewis & Bockius LLP

(57) ABSTRACT

A safety belt device configured for a vehicle may include a belt driving device disposed on a seat, connected to a waist belt in a state in which an occupant wears a seat belt, and moving the waist belt in a predetermined direction to allow the waist belt to wrap around the occupant's waist when the waist belt is positioned at a rear side and to allow the waist belt to be caught between an ankle and the waist of the occupant when the waist belt is moved forward thereof; and a controller receiving a signal generated according to an occurrence of a vehicle collision and controlling the belt driving device upon receiving the impact signal to allow the waist belt to be moved from the rear to the front.

20 Claims, 16 Drawing Sheets

(56) References Cited

U.S. PATENT DOCUMENTS

| | | | |
|---|---|---|---|
| 8,439,448 B2* | 5/2013 | Murthy | B60N 2/065 |
| | | | 297/468 |
| 9,802,570 B1 | 10/2017 | Elton et al. | |
| 2015/0217720 A1* | 8/2015 | Palaniappan | B60R 22/18 |
| | | | 280/804 |

* cited by examiner

SAFETY BELT DEVICE FOR VEHICLE

CROSS REFERENCE TO RELATED APPLICATION

The present application claims priority to Korean Patent Application No. 10-2018-0054180 filed on May 11, 2018, the entire contents of which is incorporated herein for all purposes by this reference.

BACKGROUND OF THE INVENTION

Field of the Invention

The present invention relates to a safety belt device configured for a vehicle which changes a position of a seat belt according to a posture of an occupant to stably restrain the occupant.

Description of Related Art

A safety belt has been used on a seat in a vehicle to protect an occupant from an impact generated when a vehicle accident occurs. The safety belt is a safety device that restrains the occupant's frontal behavior when a vehicle collision occurs and allows the occupant to be in contact with an airbag at a correct position.

Recently, as an autonomous vehicle has been developed, a seat is configured to freely change a seating posture of the occupant while a vehicle is traveling. That is, the occupant maintains a lying posture when a vehicle is traveling autonomously, and when the occupant wears a seat belt in a state in which the seat is reclined, a waist belt of the seat belt is placed on the occupant's abdominal region.

When a vehicle collision occurs in the above-described state, as the waist belt presses the occupant's abdominal region, injury to the occupant becomes serious, and the waist belt slips and loses its restraining force so that the safety belt does not protect stably the occupant.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a safety belt device configured for a vehicle which changes a position of a seat belt according to a posture of an occupant to stably restrain the occupant.

In various aspects of the present inventions, a safety belt device configured for a vehicle according to an exemplary embodiment of the present invention may include a belt driving device disposed on a seat, connected to a waist belt in a state in which an occupant wears a seat belt, and moving the waist belt in a front and rear direction to allow the waist belt to wrap around the occupant's waist when the waist belt is positioned at a rear side and to allow the waist belt to be caught between an ankle and the waist of the occupant when the waist belt is moved forward thereof; and a controller receiving a signal generated according to an occurrence of a vehicle collision and controlling the belt driving device upon receiving the impact signal to allow the waist belt to be moved from the rear side to the front.

The belt driving device may include a first moving mechanism and a second moving mechanism provided on both sides of the seat, respectively, and configured to allow the waist belt to be connected thereto and configured to allow the waist belt to be moved in the front and rear direction according to a movement thereof in the front and rear direction thereof.

The first moving mechanism may include a first front and rear moving device slidably disposed on a first guide portion extending in the front and rear direction along a seat rail, and a first up-down moving device disposed to be movable in a vertical direction on the first front and rear moving device. Here, the waist belt is connected to the first up-down moving device.

The first front and rear moving device may include a first sliding portion slid on the first guide portion, and a first extension portion extending upwards from the first sliding portion. Here, the first up-down moving device is moveably disposed on the first extension portion.

The first guide portion and the first sliding portion may be screw-coupled to each other, and the first guide portion may receive a power from a first driving motor provided on the seat rail or a bottom surface and be then rotated to allow the first sliding portion to be moved along the first guide portion.

The first up-down moving device may include a first webbing moving portion disposed to be movable in the vertical direction along the first extension portion; and a first webbing rotation portion provided with a buckle portion, which is moved together with the first webbing moving portion, and configured to allow the buckle portion to be rotated. Here, the waist belt passes through and is connected to the buckle portion.

The first extension portion may have a first gear groove formed thereon and extending in a longitudinal direction thereof, and the first webbing moving portion may be provided with a first up-down moving motor which is engaged with the first gear groove to be moved along the first gear groove in a rotating operation.

The first webbing rotation portion may include a first rotary motor configured to be moved along with the first webbing moving portion, and a first rotary plate around which the buckle portion is coupled. Here, the first rotary motor passes through and is coupled to a center of the first rotary plate.

The safety belt device configured for the vehicle may further include a first housing formed to cover the first webbing moving portion and the first webbing rotation portion, and the first webbing moving portion and the first webbing rotation portion may be coupled to the first housing to allow the first webbing rotation portion to be moved together with the first webbing moving portion.

The second moving mechanism may include a second front and rear moving device slidably disposed on a second guide portion extending in the front and rear direction along the seat rail and a second up-down moving device disposed to be moveable in the vertical direction on the second front and rear moving device. Furthermore, the second moving mechanism may further include a webbing guide which is detachably disposed on a tongue provided on the waist belt and is configured to be detached from the tongue when the second up-down moving device is moved and coupled, and the waist belt passes through and is connected to the webbing guide.

The second front and rear moving device may include a second sliding portion slid on the second guide portion and a second extension portion extending upwards from the second sliding portion. Here, the second up-down moving device is moveably disposed on the second extension portion.

The second guide portion and the second sliding portion may be screw-coupled to each other, and the second guide portion may receive a power from a second driving motor provided on the seat rail or the bottom surface and may be then rotated to allow the second sliding portion to be moved along the second guide portion.

The second up-down moving device may include a second webbing moving portion disposed to be movable in the vertical direction along the second extension portion; and a second webbing rotation portion configured to be moved together with the second webbing moving portion and to be coupled to the webbing guide when moved upward.

The second extension portion may have a second gear groove formed thereon and extending in a longitudinal direction thereof, and the second webbing moving portion may be provided with a second up-down moving motor which is engaged with the second gear groove to be moved along the second gear groove in a rotating operation.

The second webbing rotation portion may include a second rotary motor configured to be moved along with the second webbing moving portion; and a second rotary plate on which a guide tongue inserted into and coupled to the webbing guide is formed. Here, the second rotary motor passes through and is coupled to a center of the second rotary plate.

A hook portion engageably connected to the webbing guide may be rotatably disposed on the tongue of the waist belt, an insertion hole into the guide tongue is inserted and an engaging recess to which the hook portion is engageably connected may be formed on the webbing guide, and the hook portion may include a hook bar and a guide bar. Here, the hook bar may be rotatably disposed on the tongue and the guide bar may extend from the hook bar to be placed in the insertion hole when the hook bar is inserted into the engaging recess.

The safety belt device configured for the vehicle may further include a second housing formed to cover the second webbing moving portion and the second webbing rotation portion. Here, the second webbing moving portion and the second webbing rotation portion may be coupled to the second housing to allow the second webbing rotation portion to be moved together with the second webbing moving portion.

When an impact signal is input, the controller may be configured to control the belt driving device to allow the first front and rear moving device and the second front and rear moving device to be moved forward after the first up-down moving device and the second up-down moving device are operated and moved upward.

When a vehicle collision signal is input, the controller may be configured to control the belt driving device to allow the first rotary plate of the first webbing rotation portion to be rotated in a state in which the first up-down moving device and the second up-down moving device are operated and moved upward, matching positions of the buckle portion and the webbing guide, and after the first front and rear moving device and the second front and rear moving device are moved forward, the controller may rotate the first rotary plate of the first webbing rotation portion and the second rotary plate of the second webbing rotation portion forward to allow the waist belt to be engaged with the occupant's knee.

The belt driving device may include rotation bars provided on both sides of the seat, respectively, one end portion of each of the rotation bars being rotatably disposed at a front side of the seat with respect to a rotational axis thereof and the other end portion being provided with a guide buckle to which the waist belt is connected, and an actuator disposed on the seat to be connected to the rotational axis of the rotation bar and transmitting a rotational power to rotate the rotation bar with respect to the rotational axis.

The guide buckle may be rotatably disposed on the other end portion of the rotation bar.

Arm rest holders may be provided on both sides of the seat, and each arm rest holder may extend on a path along which the waist belt is moved by the belt driving device, and surrounds the belt driving device so as not to be exposed to the outside.

The controller may move the waist belt rearward when the waist belt is moved forward by the belt driving device to be positioned to be caught between an ankle and a knee of the occupant.

The controller may further receive information according to a seat angle and control the belt driving device to be operated when the seat angle is greater than a set angle.

The safety belt device configured for the vehicle having the above-described configuration allows the waist belt of the seat belt to restrain the occupant's waist in normal times, and allows the waist belt to be moved forward in a state in which the occupant is in a lying position so that the waist belt is moved to the occupant's knee. Accordingly, the waist belt restrains the occupant who is in various postures to secure a restraining force for the occupant.

The waist belt is moved to the knee side without pressing the abdominal region of the occupant who is in a lying position, and as the waist belt restrains the occupant's knee, the occupant is stably supported without being deviated from the seat.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
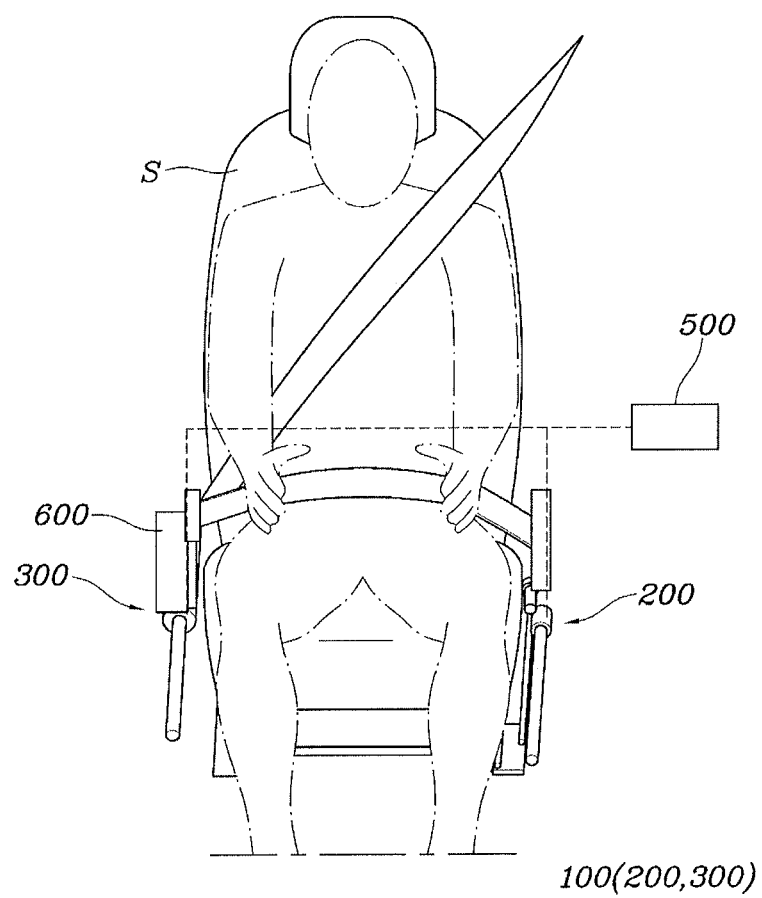
FIG. 1 is a view showing a safety belt device configured for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

A safety belt device configured for a vehicle according to the exemplary embodiments of the present invention will be described below with reference to the accompanying drawings.

FIG. 1 is a view showing a safety belt device configured for a vehicle according to an exemplary embodiment of the present invention, and FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16 are views for describing the safety belt device configured for a vehicle illustrated in FIG. 1.

Figure 2:
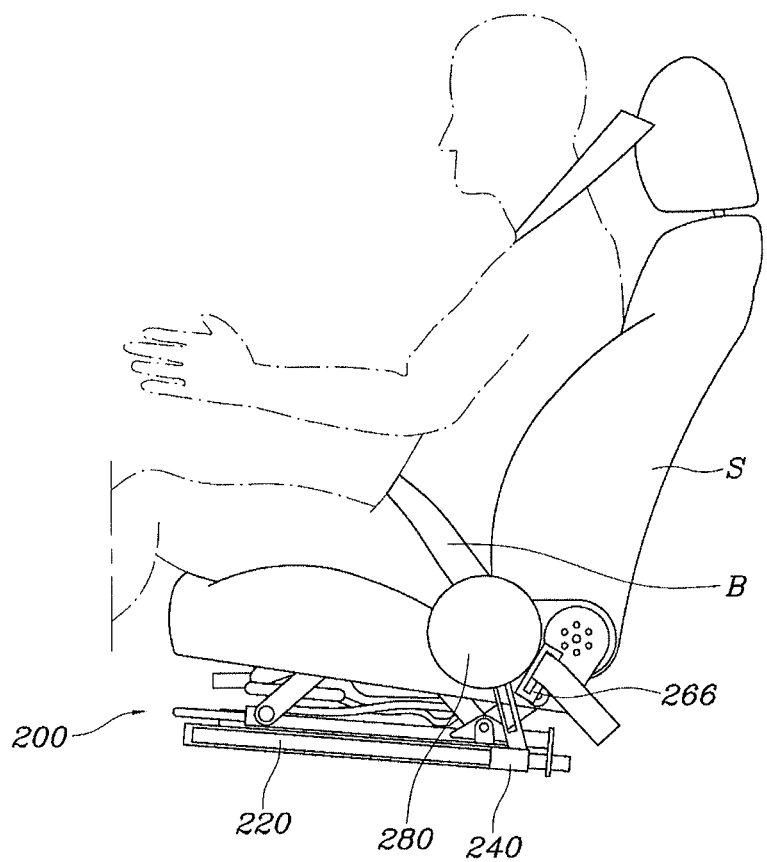
FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16 are views for describing the safety belt device configured for a vehicle illustrated in FIG. 1.
Figure 3:
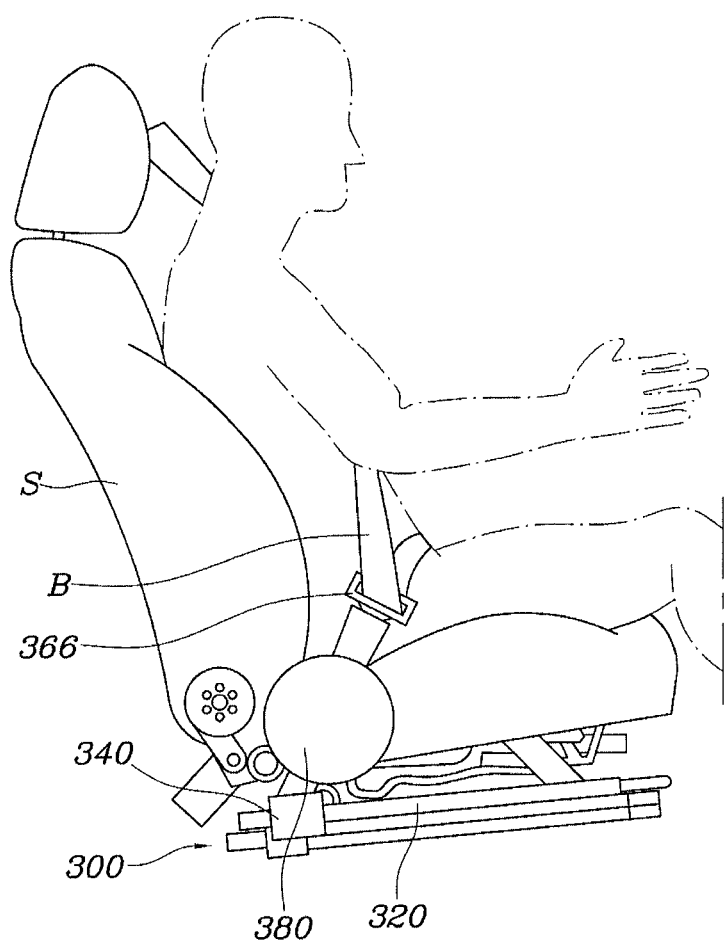

As illustrated in FIG. 1, FIG. 2, and FIG. 3, the safety belt device configured for a vehicle according to the exemplary embodiment of the present invention includes a belt driving device 100 disposed on a seat S, connected to a waist belt B in a state in which an occupant wears a seat belt, and moving the waist belt B in a front and rear direction to allow the waist belt B to wrap around the occupant's waist when the waist belt S is positioned at a rear side and to allow the waist belt B to be caught between an ankle and the waist of the occupant when the waist belt B is moved forward thereof; and a controller 500 receiving a signal generated according to an occurrence of a vehicle collision and controlling the belt driving device 100 upon receiving an impact signal to allow the waist belt B to be moved from the rear to the front.

In various aspects of the present invention, a position of the waist belt B of the seat belt restraining the occupant is moved to allow the waist belt B to stably restrain the occupant in the event of a vehicle collision.

To the present end, the present invention includes the belt driving device 100 to which the waist belt B is connected and the controller 500 controlling the belt driving device 100. Here, the controller 500 controls the belt driving device 100 when a vehicle collision occurs to determine a position of the waist belt B.

In other words, the seat belt includes a chest belt restraining the occupant's chest and the waist belt B restraining the occupant's waist, and the present waist belt B is placed on a waist region when the occupant seats in a correct posture, but when the occupant seats in a lying posture, the waist belt B is placed on an abdominal region, and thus additional injury may be incurred on the occupant when a vehicle collision occurs.

Accordingly, the controller 500 controls the belt driving device 100 when a vehicle collision occurs, to move the waist belt B from the rear to the front so that the waist belt B is caught between the ankle and a knee of the occupant to restrain the occupant's lower body.

To the present end, the controller 500 further receives information according to a seat angle and may control the belt driving device 100 to be operated when the seat angle is greater than a set angle. Here, the predetermined angle pre-stored in the controller 500 corresponds to the posture of the occupant, if the seat angle does not reach the set angle, the controller judges that the occupant is in a sitting position, and when the seat angle reaches the set angle, the controller judges that the occupant is in a lying position.

Therefore, when the seat angle is greater than the set angle, the controller 500 operates the belt driving device 100 to move the waist belt B toward the knee side of the occupant, so that the waist belt B restrains the passenger's lower body.

Information on the seat angle transmitted to the controller 500 may be judged through a sensor according to a reclining angle.

As described above, the controller 500 controls the belt driving device 100 to move the waist belt B from the abdominal region to the knee region when the occupant relines the seat and seats in a lying posture, so that it is possible to prevent injury caused by the waist belt B pressing the occupant's abdominal region when a vehicle collision occurs and the occupant may be stably supported without being deviated from the seat as the waist belt B restrains the occupant's lower body.

The above-described belt driving section 100 according to the exemplary embodiment of the present invention is specifically described. As may be seen in FIG. 1, FIG. 2, and FIG. 3, the belt driving device 100 may include a first moving mechanism 200 and a second moving mechanism 300 provided on both sides of the seat S, respectively, and the waist belt B is connected to these moving mechanisms. Furthermore, the first and second moving mechanisms are configured to allow the waist belt B to be moved in the front and rear direction according to a movement thereof in the front and rear direction thereof.

As described above, the belt driving device 100 includes the first moving mechanism 200 and the second moving mechanism 300, and the moving mechanisms are provided on both sides of the seat S, respectively, so that the waist belt B may be moved to be caught on the knee in a state in which the occupant wears the seat belt.

Here, the first moving mechanism 200 may be disposed at an anchor side and the second moving mechanism 300 may be disposed at a buckle side thereof.

Figure 4:
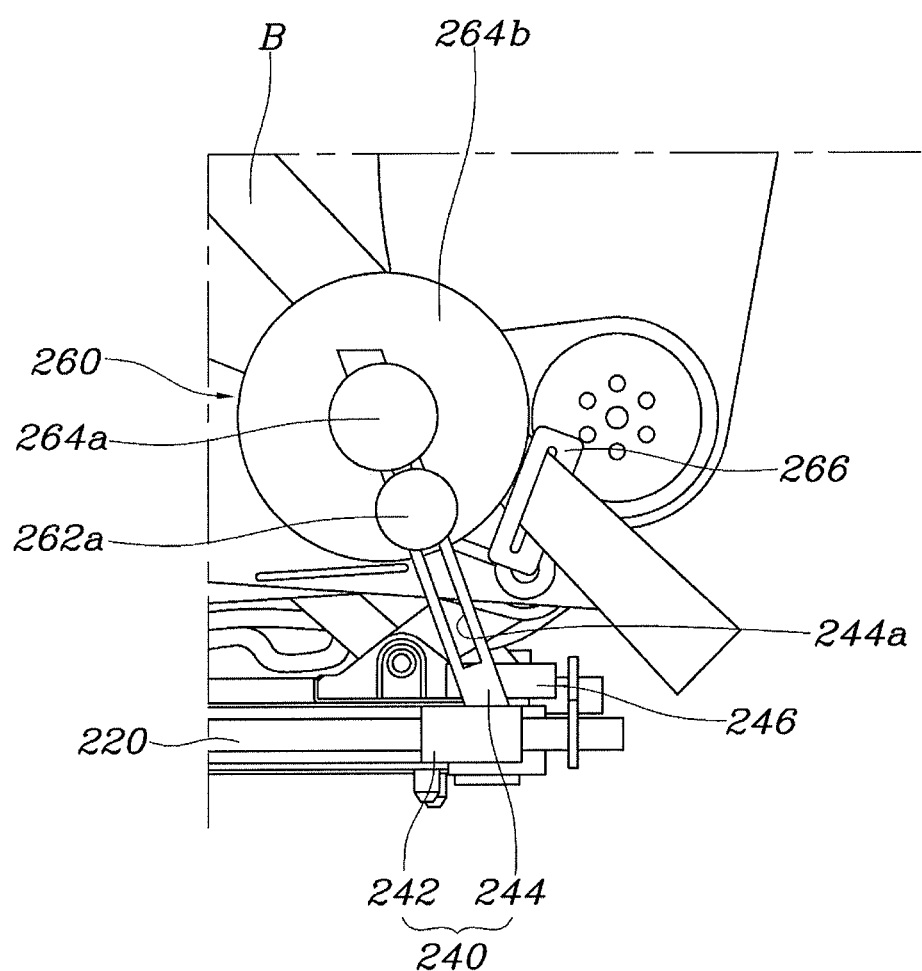
Figure 5:
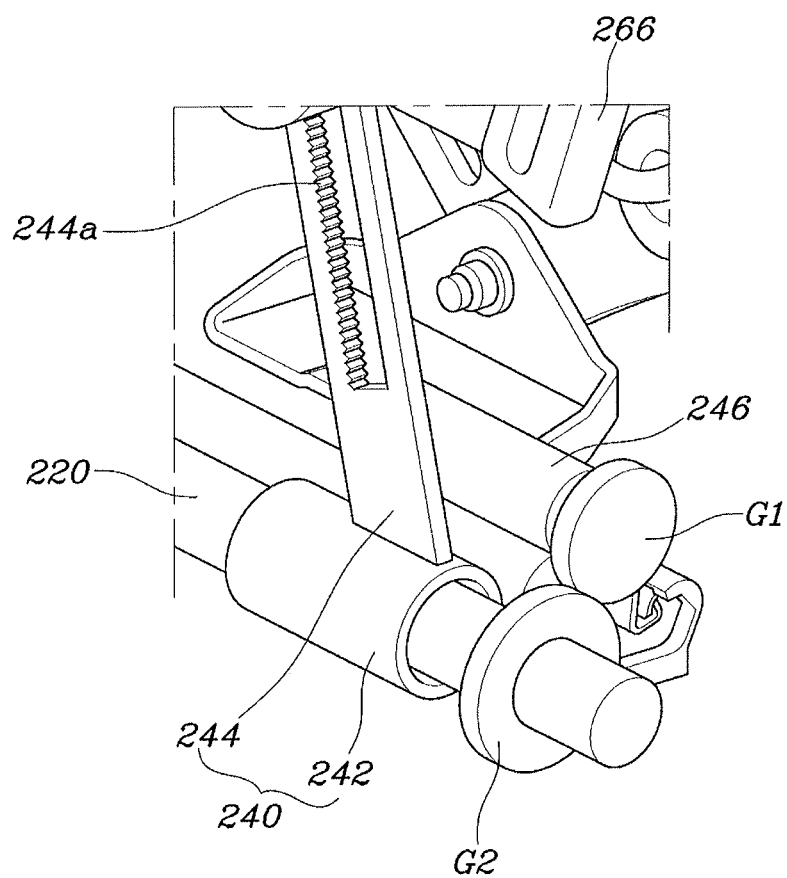

As illustrated in FIG. 4 and FIG. 5, the first moving mechanism 200 may include a first front and rear moving device 240 slidably disposed on a first guide portion 220 extending in the front and rear direction along a seat rail R and a first up-down moving device 260 disposed to be moveable in a vertical direction on the first front and rear moving device 240. Here, the waist belt B is connected to the first up-down moving device.

Like this, the first moving mechanism 200 includes the first front and rear moving device 240 and the first up-down moving device 260, the waist belt B may be moved in the vertical direction by the first up-down moving device 260, and the first front and rear moving device 240 is moved along the first guide portion 220 so that the waist belt B may be moved in the front and rear direction thereof.

Here, the first front and rear moving device 240 may include a first sliding portion 242 slid on the first guide portion 220 and a first extension portion 244 extending upwards from the first sliding portion 242 and configured to allow the first up-down moving device 260 to be moveably disposed thereon. Such the first sliding portion 242 is formed to surround the first guide portion 220 and may be moved along the first guide portion 220, and the first extension portion 244 is formed to extend upward toward the waist belt B so that the first up-down moving device 260 may be moved in the vertical direction toward the waist belt B.

A movement of the first moving mechanism 200 in the front and rear direction is described below. As may be seen in FIG. 5, the first guide portion 220 and the first sliding portion 242 are screw-coupled to each other, and the first guide portion 220 receives a power from a first driving motor 246 provided on the seat rail or a bottom surface of the vehicle and is then rotated so that the first sliding portion 242 may be moved along the first guide portion 220.

In other words, a thread is formed on an external circumferential surface of the first guide portion 220, and the first sliding portion 242 is formed to surround the first guide portion 220 and is screw-coupled to the first guide portion 220 through a thread formed on an internal circumferential surface thereof. Due to the above configuration, when the first guide portion 220 is rotated by the first driving motor 246, the first sliding portion 242 may be moved along the thread of the first guide portion 220.

Here, the first driving motor 246 may be disposed on the seat rail or the bottom surface, the first driving motor 246 is provided with a gear G1 for transmitting the power and the first guide portion 220 is provided with a gear G2 for receiving the power, and thus the first guide portion 220 is rotated by the first driving motor 246 and the first sliding portion 242 connected to the first guide portion 220 may be moved in the front and rear direction thereof.

As illustrated in FIG. 4, meanwhile, the first up-down moving device 260 may include a first webbing moving portion 262 disposed to be movable in the vertical direction along the first extension portion 244; and a first webbing rotation portion 264 provided with a buckle portion 266, which is moved together with the first webbing moving portion 262, and configured to allow the buckle portion 266 to be rotated. Here, the waist belt B passes through and is connected to the buckle portion.

Due the above configuration, the buckle portion 266 to which the waist belt B is connected may be pulled and moved in the vertical direction by the first webbing moving portion 262, and the buckle portion may be moved in the front and rear direction by the first webbing rotation portion 264 to change its position.

A first gear groove 244a is formed on the first extension portion 244 and extends in a longitudinal direction thereof, and the first webbing moving portion 262 may be provided with a first up-down moving motor 262a which is engaged with the first gear groove 244a to be moved along the first gear groove 244a in a rotating operation. As a result, as the first up-down moving motor 262a is engaged with the first gear groove 244a, the first webbing moving portion 262 may be moved in the vertical direction along the first gear groove 244a when the first up-down moving motor 262a is operated.

In addition to the above, the first webbing rotation portion 264 may include a first rotary motor 264a configured to be moved along with the first webbing moving portion 262 and a first rotary plate 264b around which the buckle portion 266 is coupled. Here, the first rotary motor 264a passes through and coupled to a center of the first rotary plate.

Figure 6:
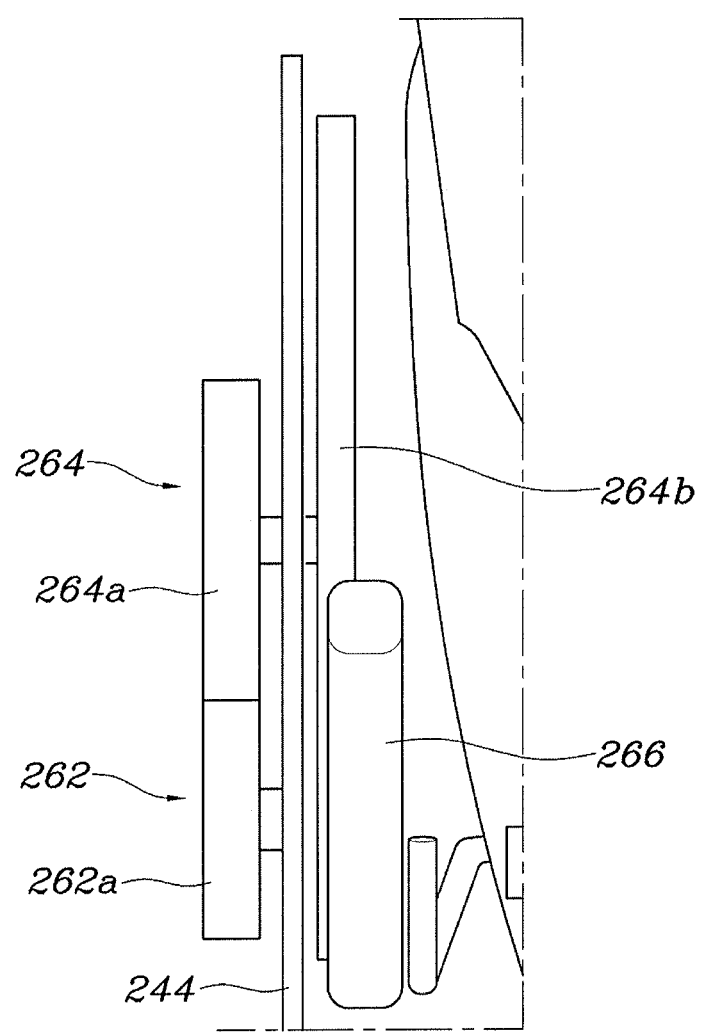

As may be seen in FIGS. 4 and 6, the first webbing rotation portion 264 includes the first rotary motor 264a and the first rotary plate 264b, and the first rotary plate 264b is provided with the buckle portion 266 to which the waist belt B is connected, and thus as the buckle portion 266 is rotated when the first rotary plate 264b is rotated by the first rotary motor 264a, it is possible to change a position of the waist belt B.

By configuring the first rotary motor 264a to be moved together with the first webbing moving portion 262, the first rotary plate 264b may be moved in the vertical direction following a movement direction of the first rotary motor 264a and the first webbing moving portion 262.

To the present end, the first moving mechanism further includes a first housing 280 formed to cover the first webbing moving portion 262 and the first webbing rotation portion 264, and as the first webbing moving portion 262 and the first webbing rotation portion 264 are coupled to the first housing 280, the first webbing rotation portion 264 may be moved together with the first webbing moving portion 262. In other words, since the first webbing moving portion 262 and the first webbing rotation portion 264 are secured to the first housing 280 in the first housing 280, when the first webbing moving portion 262 is moved in the vertical direction along the first extension portion 244, the first housing 280 and the first webbing rotation portion 264 may be moved along the first webbing moving portion 262. Furthermore, since the first webbing moving portion 262 and the first webbing rotation portion 264 in the first housing 280 are not exposed to the outside, a deterioration of appearance design is prevented, and an operation error caused by external factors when the first webbing moving portion 262 and the first webbing rotation portion 264 are operated may be prevented.

Like this, it is possible to move the waist belt B in the vertical direction and the front and rear direction through the above-described first moving mechanism 200.

Figure 7:
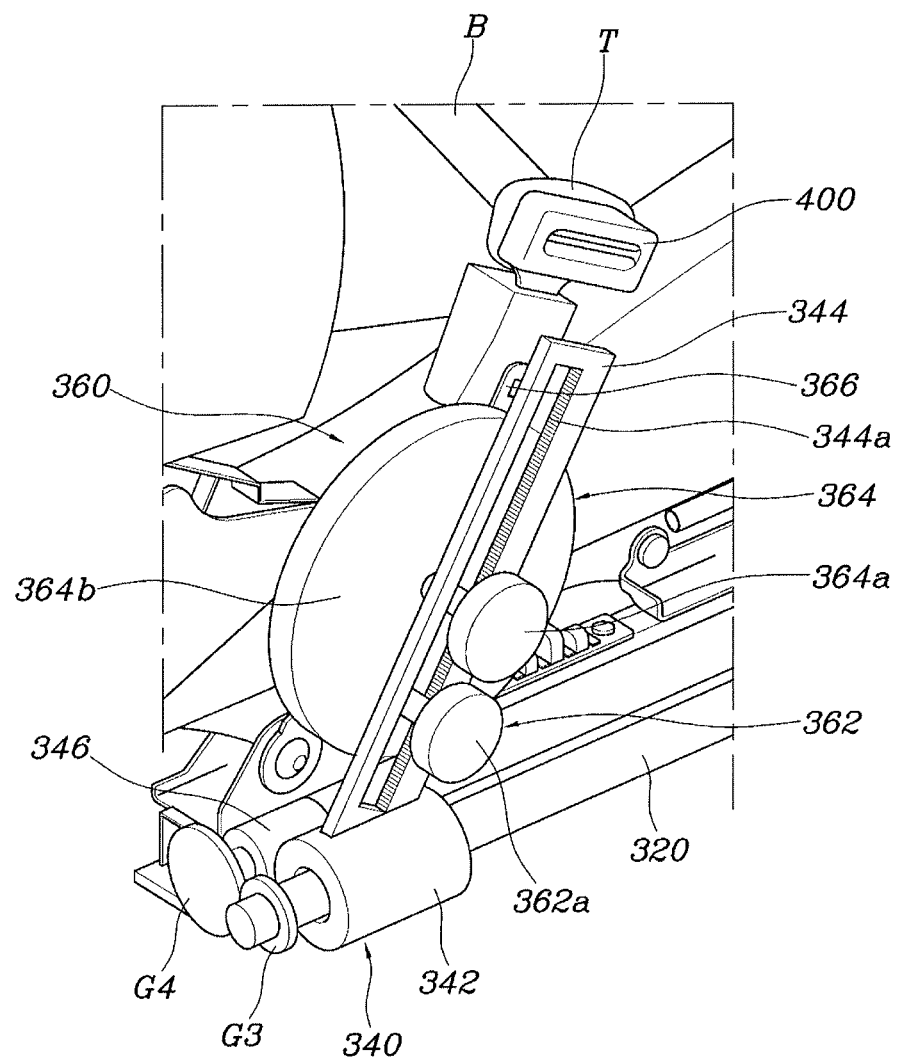

Meanwhile, as illustrated in FIG. 7, the second moving mechanism 300 includes a second front and rear moving device 340 slidably disposed on a second guide portion 320 extending in the front and rear direction along the seat rail R and a second up-down moving device 360 disposed to be moveable in the vertical direction on the second front and rear moving device 340. The second moving mechanism may further include a webbing guide 400 which is detachably disposed on a tongue T provided on the waist belt B and is configured to be detached from the tongue T when the second up-down moving device 360 is moved and coupled. Here, the waist belt B passes through and is connected to the webbing guide.

Like this, the second moving mechanism 300 includes the second front and rear moving device 340 and the second up-down moving device 360, the waist belt B may be moved in the vertical direction by the second up-down moving device 360, and the second front and rear moving device 340 is moved along the second guide portion 320 so that the waist belt B may be moved in the front and rear direction thereof.

Here, the second front and rear moving device 340 may include a second sliding portion 342 slid on the second guide portion 320, and a second extension portion 344 extending upwards from the second sliding portion 342. Also, the second up-down moving device 360 is moveably disposed on the second extension portion. Such the second sliding portion 342 is formed to surround the second guide portion 320 and is connected to be moved along the second guide portion 320, and the second extension portion 344 is formed to extend upward toward the waist belt B so that the second up-down moving device 360 may be moved in the vertical direction toward the waist belt B.

A movement of the second moving mechanism 300 in the front and rear direction is described below. As may be seen in FIG. 7, the second guide portion 320 and the second sliding portion 342 are screw-coupled to each other, and the second guide portion 320 receives a power from a second driving motor 346 provided on the seat rail or a bottom surface and is then rotated so that the second sliding portion 342 may be moved along the second guide portion 320.

In other words, a thread is formed on an external circumferential surface of the second guide portion 320, and the second sliding portion 342 is screw-coupled to the second guide portion 320 through a thread formed on an internal circumferential surface thereof in a state in which the second sliding portion surrounds the second guide portion 320. Due to the above configuration, when the second guide portion 320 is rotated by the second driving motor 346, the second sliding portion 342 may be moved along the thread of the second guide portion 320.

Here, the second driving motor 346 may be disposed on the seat rail or the bottom surface, the second driving motor 346 is provided with a gear G3 for transmitting the power and the second guide portion 320 is provided with a gear G4 for receiving the power, and thus the second guide portion 320 is rotated by the second driving motor 346 and the second sliding portion 342 connected to the second guide portion 320 may be moved in the front and rear direction thereof.

As illustrated in FIG. 7, the second up-down moving device 360 may include a second webbing moving portion 362 disposed to be movable in the vertical direction along the second extension portion 344; and a second webbing rotation portion 364 configured to be moved together with the second webbing moving portion 362 and to be coupled to the webbing guide 400 when moved upward.

Due to the above configuration, the webbing guide 400 to which the waist belt B is connected may be moved in the vertical direction by the second webbing moving portion 362 and the second webbing rotation portion 364. Here, the webbing guide 400 is detachably disposed on the tongue T provided on the waist belt B and the waist belt B passes through and is connected to the webbing guide, and the webbing guide is formed to be detached from the tongue T when the second webbing rotation portion 364 of the second up-down moving device 360 is coupled thereto, and thus it is possible to move the waist belt B through a movement of the webbing guide 400 in the tongue to which the waist belt B is connected.

A second gear groove 344a is formed and extends on the second extension portion 344 in a longitudinal direction thereof, and the second webbing moving portion 362 may be provided with a second up-down moving motor 362a which is engaged with the second gear groove 344a to be moved along the second gear groove 344a in a rotating operation. As a result, as the second up-down moving motor 362a is engaged with the second gear groove 344a, the second webbing moving portion 362 may be moved in the vertical direction along the second gear groove 344a when the second up-down moving motor 362a is operated.

In addition to the above, the second webbing rotation portion 364 may include a second rotary motor 364a configured to be moved along with the second webbing moving portion 362 and a second rotary plate 364b having a guide tongue 366 formed thereon and inserted into and coupled to the webbing guide 400. Here, the second rotary motor 364a passes through and coupled to a center of the second rotary plate.

As illustrated in FIG. 7, the second webbing rotation portion 364 includes the second rotary motor 364a and the second rotary plate 364b, and the second rotary plate 364b is provided with the guide tongue 366 inserted into and coupled to the webbing guide 400, and thus it is possible to change a position of the waist belt B together with the webbing guide 400.

By configuring the second rotary motor 364a to be moved together with the second webbing moving portion 362, the second rotary plate 364b may be moved in the vertical direction following a movement direction of the second rotary motor 364a and the second webbing moving portion 362.

To the present end, the second moving mechanism further includes a second housing 380 formed to cover the second webbing moving portion 362 and the second webbing rotation portion 364, and as the second webbing moving portion 362 and the second webbing rotation portion 364 are coupled to the second housing 380, the second webbing rotation portion 364 may be moved together with the second webbing moving portion 362.

In other words, since the second webbing moving portion 362 and the second webbing rotation portion 364 are provided in and secured to the second housing 380, the second housing 380 and the second webbing rotation portion 364 may be moved along the second webbing moving portion 362 when the second webbing moving portion 362 is moved in the vertical direction along the second extension portion 344. Furthermore, since the second webbing moving portion 362 and the second webbing rotation portion 364 in the second housing 380 are not exposed to the outside, a deterioration of appearance design is prevented, and an operation error caused by external factors when the second webbing moving portion 362 and the second webbing rotation portion 364 are operated may be prevented.

Like this, it is possible to move the waist belt B in the vertical direction and the front and rear direction through the above-described second moving mechanism 300.

Figure 8:
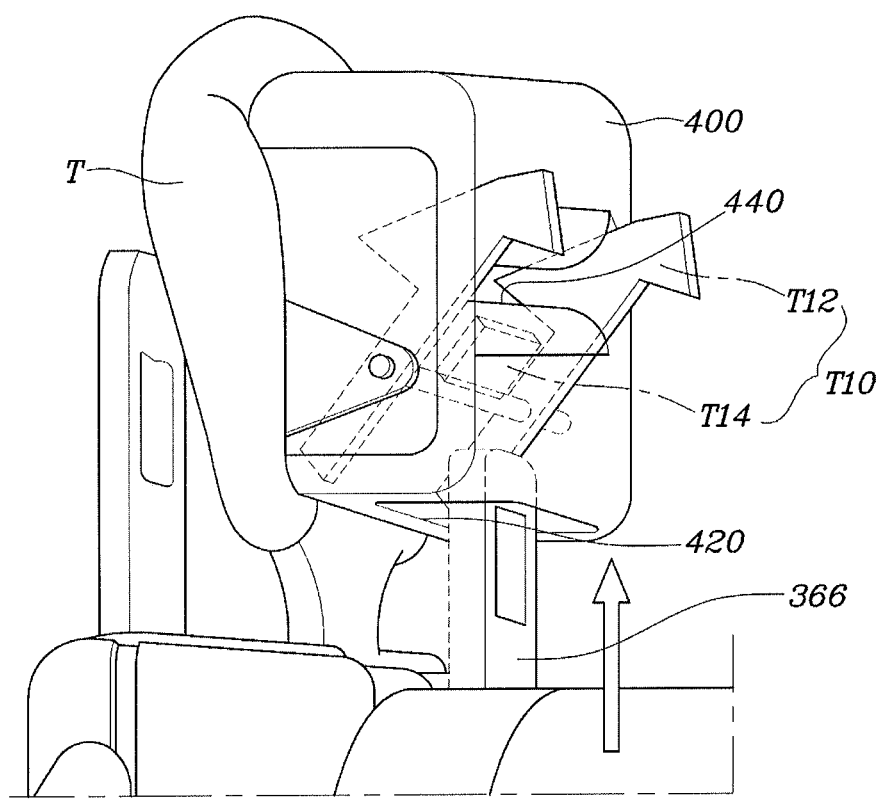
Figure 9:
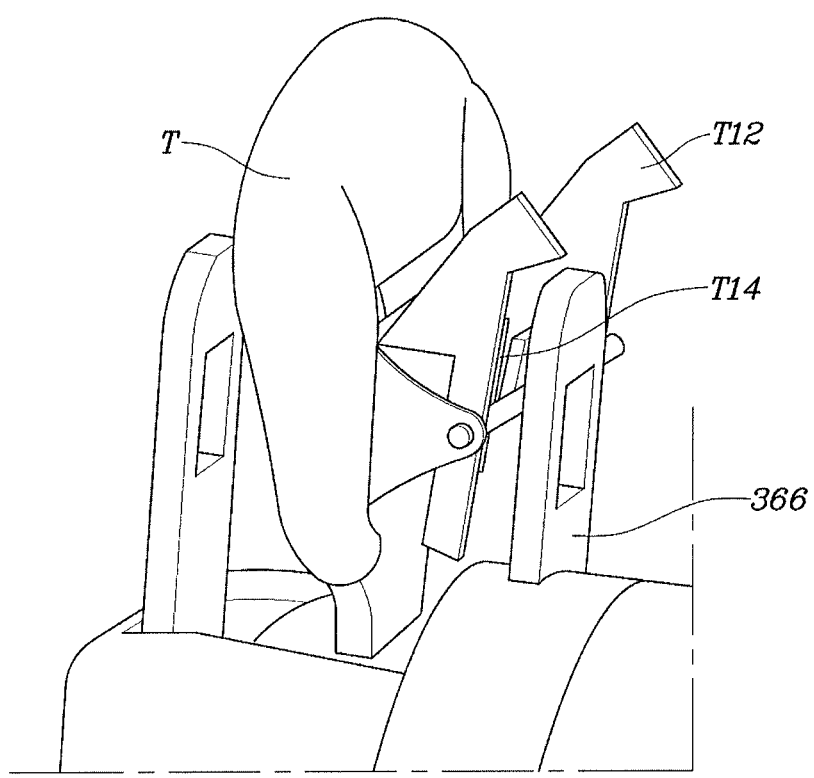

Meanwhile, the webbing guide 400 is specifically described below. As illustrated in FIG. 8 and FIG. 9, a hook portion T10 engageably connected to the webbing guide 400 is rotatably disposed on the tongue T of the waist belt B, an insertion hole 420 into which the guide tongue 366 is inserted and an engaging recess 440 to which the hook portion T10 is engageably connected are formed on the webbing guide 400, and a hook bar T12 and the guide bar T14 may be formed on the hook portion T10. Here, the hook bar is rotatably disposed on the tongue T and the guide bar T14 extends from the hook bar T12 to be placed in the insertion hole 420 when the hook bar is inserted into the engaging recess 440.

In other words, the hook portion T10 is rotatably disposed on the tongue T of the waist belt B, and the hook portion T10 is inserted into the engaging recess 440 of the webbing guide 400, and thus the webbing guide 400 is not deviated from the tongue T. The hook portion T10 includes the hook bar T12 coupled to the webbing guide 400 and the guide bar T14 to which the guide tongue 366 is coupled.

As illustrated in FIG. 8, in a state in which the hook bar T12 of the hook portion T10 provided on the tongue T is inserted into the engaging recess 440 of the webbing guide 400, when the guide tongue 366 is inserted into the insertion hole 420 of the webbing guide 400, the guide bar T14 of the hook portion T10 is pushed and rotated by the guide tongue 366. As described above, when the hook portion T10 is rotated by the guide tongue 366, the tongue T and the webbing guide 400 may be separated as the hook bar T12 is deviated from the engaging recess 440. Due to the above configuration, in a state in which the guide tongue 366 is inserted into the webbing guide 400, when the second moving mechanism 300 is moved, the waist belt B connected to the webbing guide 400 is pulled and moved together, so that it is possible to change a position of the waist belt B.

Meanwhile, when an impact signal is input, the controller 500 controls the belt driving device 100 to enable the first front and rear moving device 240 and the second front and rear moving device 340 to be moved forward after the first up-down moving device 260 and the second up-down moving device 360 are operated and moved upward.

As described above, when the belt driving device 100 is controlled, as the first up-down moving device 260 and the second up-down moving device 360 are operated and moved upward, the waist belt B is deviated from the waist region of the occupant, and the first front and rear moving device 240 and the second front and rear moving device 340 are then moved forward, so that it is possible to minimize the interference of the waist belt B with the occupant's legs, securing the operability.

Figure 10:
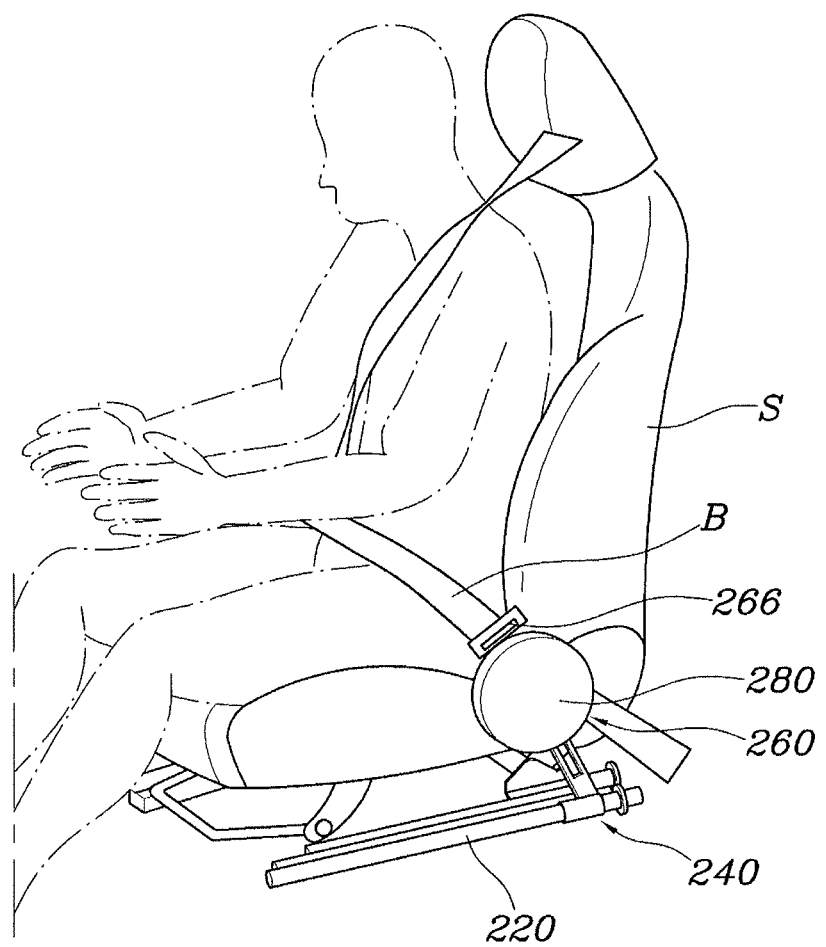
Figure 12:
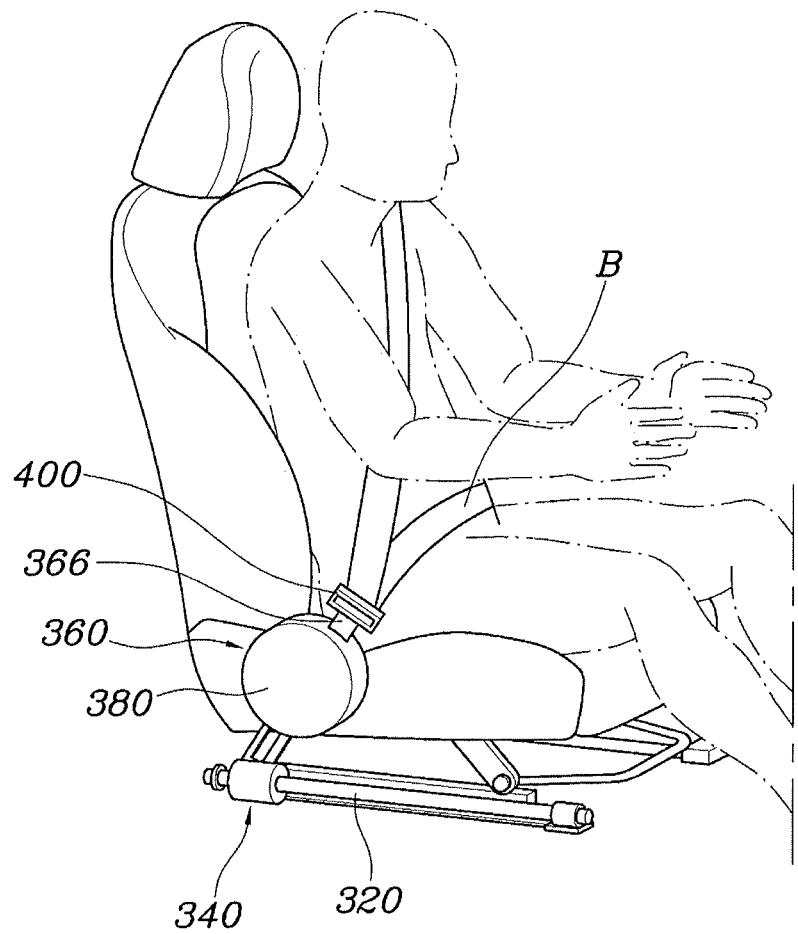

When a vehicle collision signal is input, the controller 500 controls the belt driving device 100 to allow the first rotary plate 264b of the first webbing rotation portion 264 to be rotated as illustrated in FIGS. 10 and 12 in a state in which the first up-down moving device 260 and the second up-down moving device 360 are operated and moved upward, matching positions of the buckle portion 266 and the webbing guide 400. At the instant time, as the guide tongue 366 is inserted, the webbing guide 400 is deviated from the tongue T to be shifted to a movable state, and as the first up-down moving device 260 and the second up-down moving device 360 are operated and moved upward, the waist belt B is spaced from the waist region of the occupant.

Figure 11:
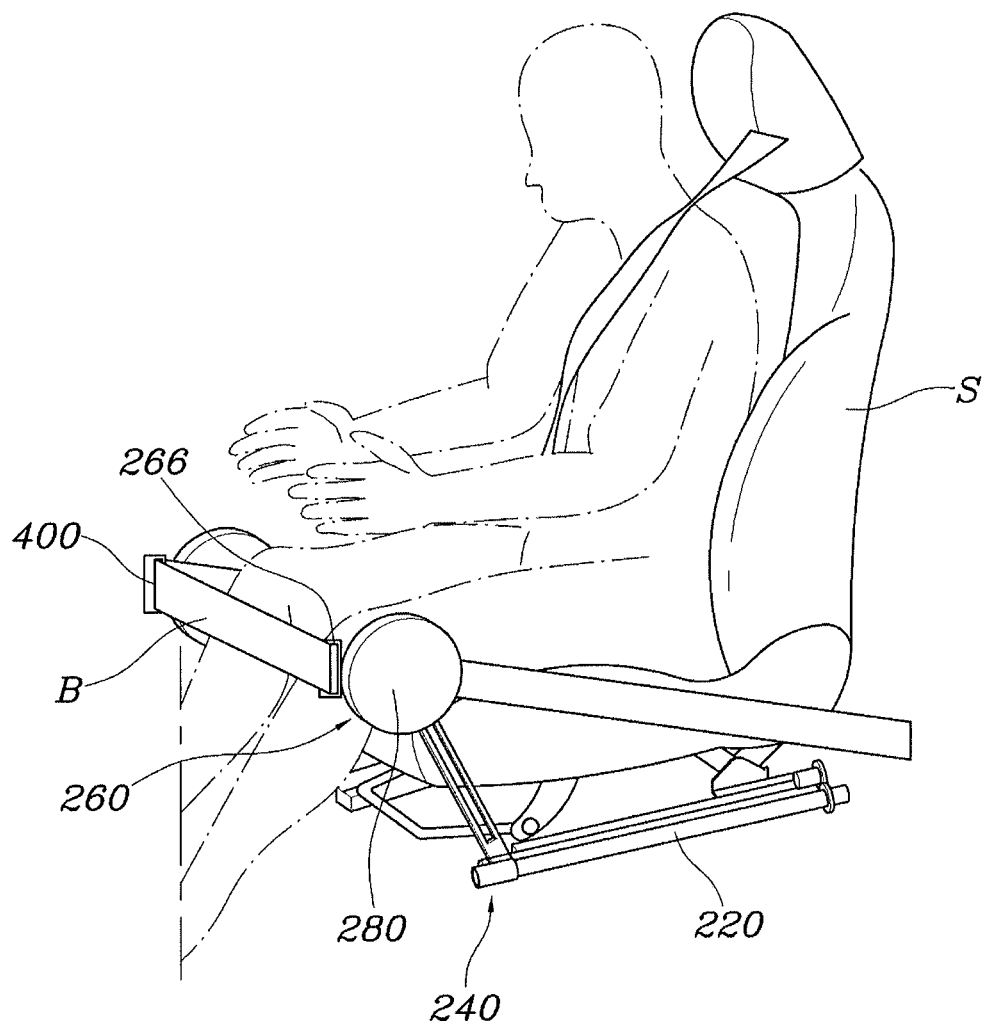
Figure 13:
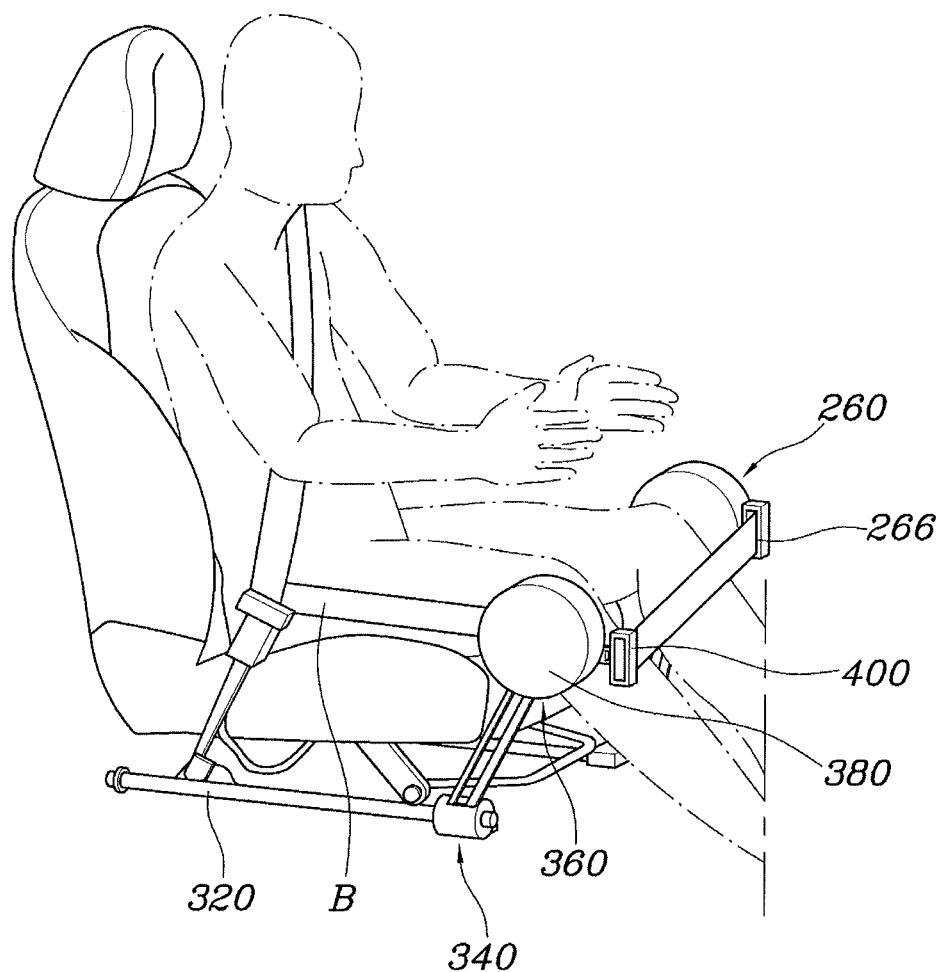

In the instant state, as illustrated in FIGS. 11 and 13, after the first front and rear moving device 240 and the second front and rear moving device 340 are moved forward, the controller rotates the first rotary plate 264b of the first webbing rotation portion 264 and the second rotary plate 364b of the second webbing rotation portion 364 forward, and thus the waist belt B is caught on the occupant's knee. As a result, the occupant's lower body is restrained by the waist belt B, so that it is possible to maintain a state in which the occupant seats on the seat and to prevent injury caused by the waist belt B pressing the occupant's abdominal region.

Figure 16:
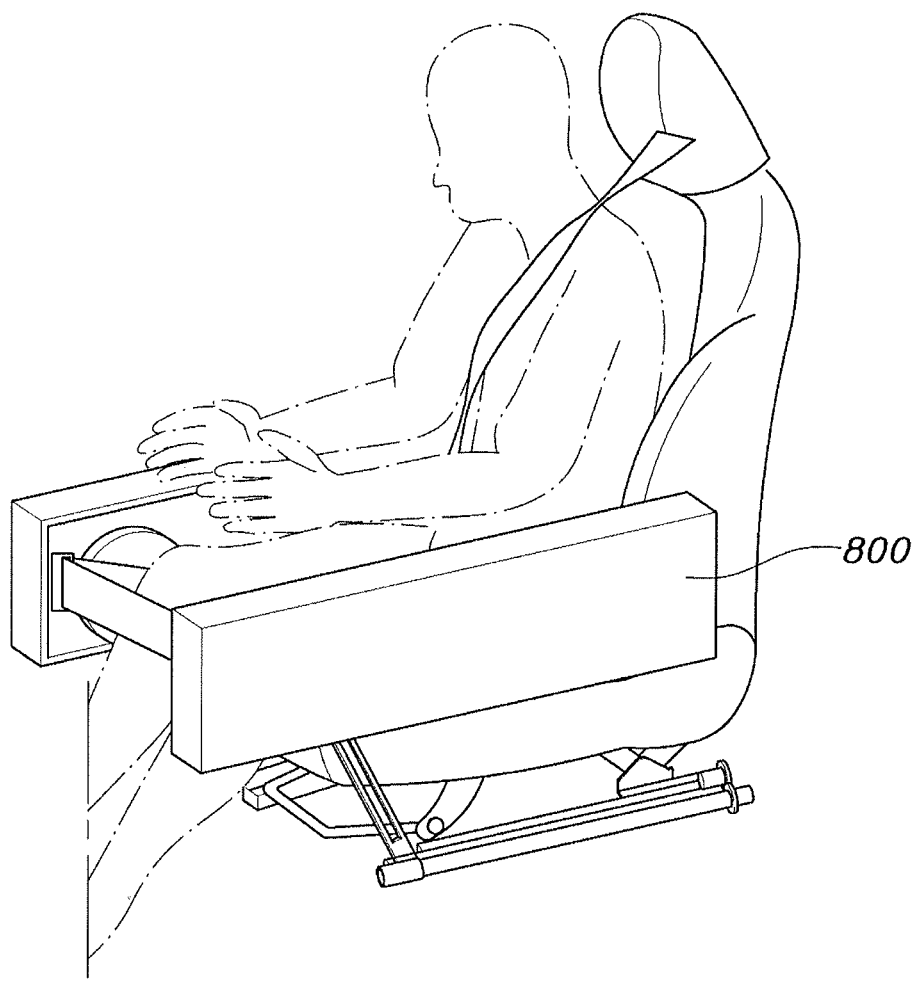

Meanwhile, as illustrated in FIG. 16, arm rest holders 800 may be provided on both sides of the seat, each of the arm rest holders extends on a path along which the waist belt B is moved by the belt driving device 100, and surrounds the belt driving device 100 so as not to be exposed to the outside. Since the first moving mechanism 200 and the second moving mechanism 300 are not exposed by the armrest holder 800 due to the above configuration, an appearance design may be secured and it is possible to prevent the first moving mechanism 200 and the second moving mechanism 300 from being interfered with the occupant during an operation thereof.

Meanwhile, the controller 500 moves the waist belt B rearward when the waist belt B is moved forward by the belt driving device 100 to be positioned to be caught between the ankle and the knee of the occupant, so that the waist belt B may more stably restrain the occupant's lower body in a state in which the waist belt B is caught on the occupant's knee side thereof.

Figure 14:
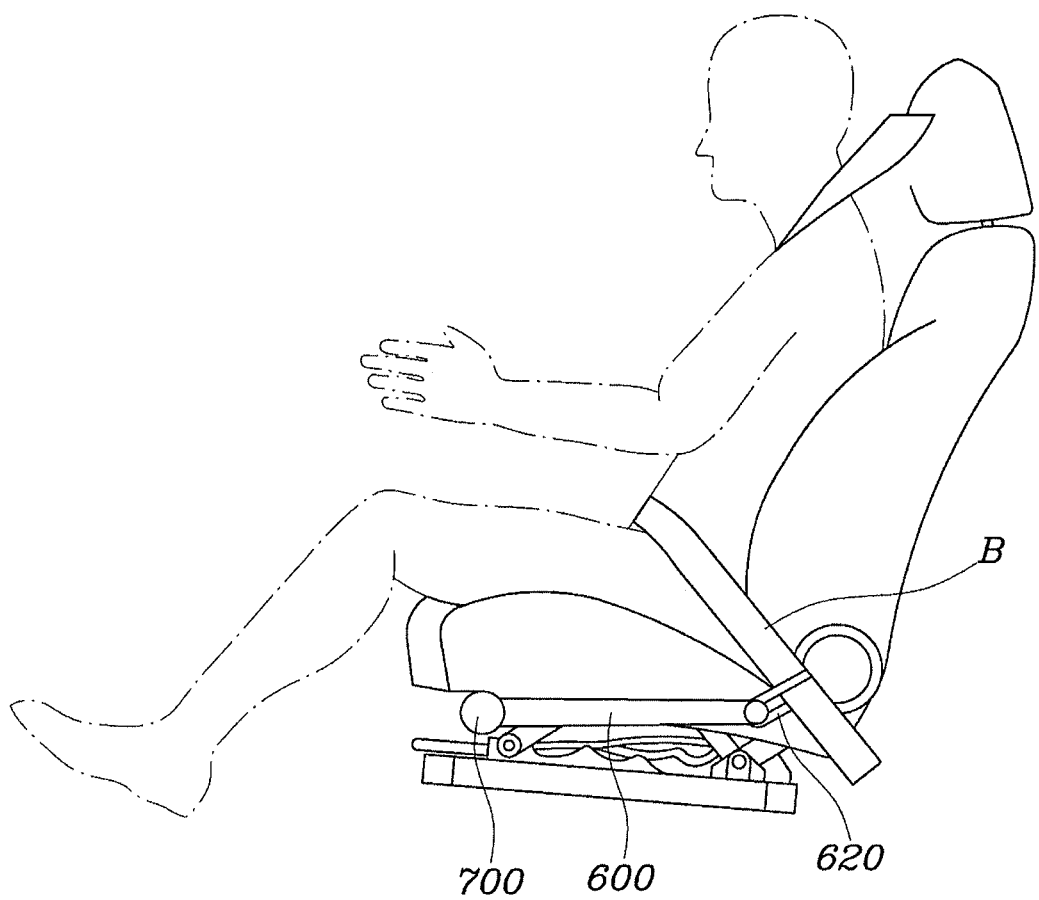
Figure 15:
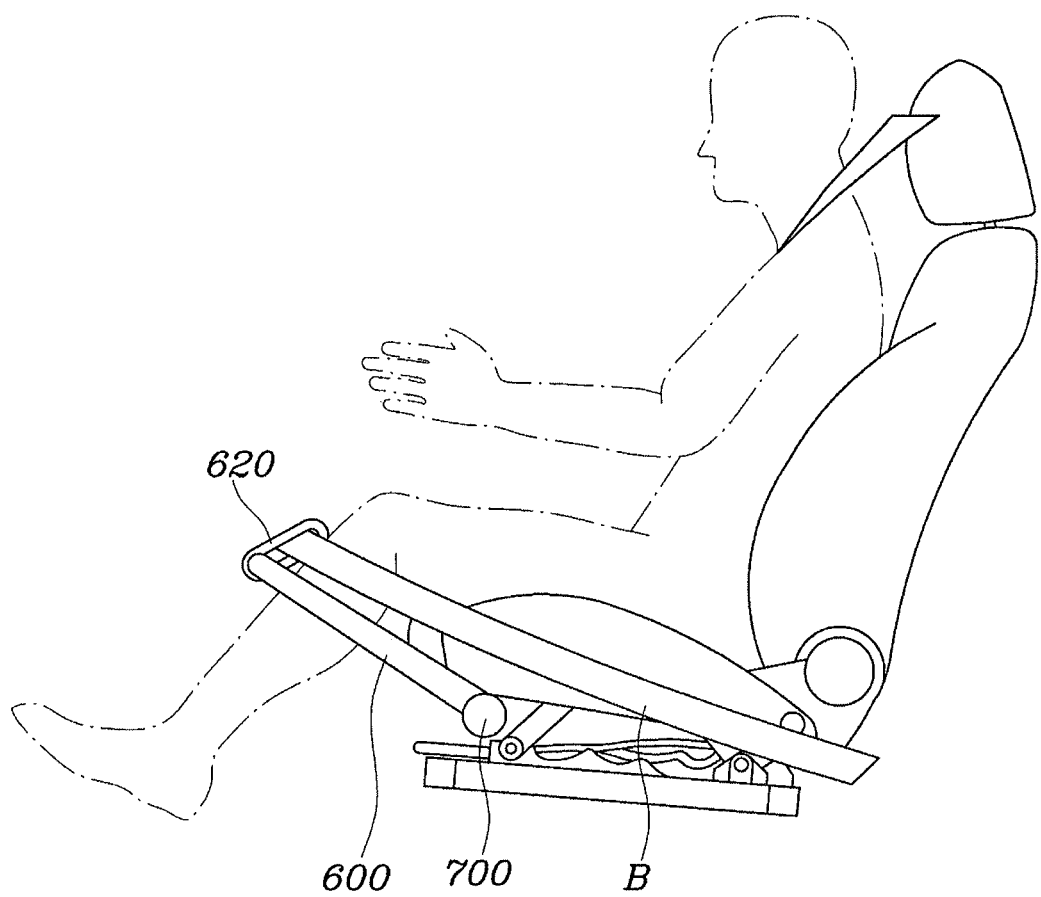

Meanwhile, as another exemplary embodiment of the belt driving device 100, as illustrated in FIG. 14, the belt driving device 100 may include rotation bars 600 provided on both sides of the seat, respectively, one end portion of each of the rotation bars being rotatably disposed at a front side of the seat with respect to a rotational axis thereof and the other end portion being provided with a guide buckle 620 to which the waist belt B is connected; and an actuator 700 disposed on the seat to be connected to the rotational axis of the rotation bar 600 and transmitting a rotational power to rotate the rotation bar 600 with respect to the rotational axis. Here, the guide buckle 620 is rotatably disposed on the other end portion of the rotation bar 600.

In other words, the rotation bar 600 may be rotatably disposed on the seat frame and extends from a front side to a rear side of the seat to be connected to the waist belt B through the guide buckle 620. As a result, as illustrated FIG. 15, when the rotation bar 600 is rotated toward an upper front side with respect to an axial center of a front side of the seat, the waist belt B may be pulled forward to be caught on the occupant's knee side thereof.

An electric motor may be employed as the actuator 700 transmitting the power to the rotation bar 600, and the actuator is disposed on the seat frame and is connected to one end portion of the rotation bar 600, and thus the actuator provides the power for facilitating the rotation bar 600 to be rotated when operated.

The safety belt device configured for the vehicle having the above-described configuration allows the waist belt B of the seat belt to restrain the occupant's waist in normal times, and allows the waist belt B to be moved forward in a state in which the occupant is in a lying position so that the waist belt is moved to the occupant's knee. Accordingly, the waist belt restrains the occupant who is in various postures to secure a restraining force for the occupant.

The waist belt B is moved to the knee side without pressing the abdominal region of the occupant who is in a lying position, and as the waist belt B restrains the occupant's knee, the occupant is stably supported without being deviated from the seat.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A safety belt device configured for a vehicle, the safety belt device comprising:
   a belt driving device disposed on a seat, connected to a waist belt in a state in which an occupant wears a seat belt, and moving the waist belt in a first predetermined direction to allow the waist belt to wrap around the occupant's waist when the waist belt is disposed at a rear side thereof and to allow the waist belt to be caught between an ankle and the waist of the occupant when the waist belt is moved forward thereof; and
   a controller configured for receiving a signal generated according to an occurrence of a vehicle collision and controlling the belt driving device upon receiving the signal to allow the waist belt to be moved from the rear to the front thereof.

2. The safety belt device configured for the vehicle of claim 1, wherein the belt driving device includes a first moving mechanism and a second moving mechanism provided on a first side and a second side of the seat, respectively, and configured to allow the waist belt to be connected thereto and configured to allow the waist belt to be moved in the first predetermined direction according to a movement thereof in the predetermined direction.

3. The safety belt device configured for the vehicle of claim 2, wherein the first moving mechanism includes:
a first front and rear moving device slidably disposed on a first guide portion extending in the first predetermined direction along a seat rail; and
a first up-down moving device disposed to be movable in a second predetermined direction thereof on the first front and rear moving device, and
wherein the waist belt is connected to the first up-down moving device.

4. The safety belt device configured for the vehicle of claim 3,
wherein the first front and rear moving device includes a first sliding portion sliding on the first guide portion and a first extension portion extending upwards from the first sliding portion, and
wherein the first up-down moving device is moveably disposed on the first extension portion.

5. The safety belt device configured for the vehicle of claim 4,
wherein the first guide portion and the first sliding portion are screw-coupled to each other, and
wherein the first guide portion receives a power from a first driving motor provided on the seat rail or a bottom surface of the vehicle and is then rotated to allow the first sliding portion to be moved along the first guide portion.

6. The safety belt device configured for the vehicle of claim 4, wherein the first up-down moving device includes:
a first webbing moving portion disposed to be movable in the second predetermined direction thereof along the first extension portion; and
a first webbing rotation portion provided with a buckle portion, which is moved with the first webbing moving portion, and configured to allow the buckle portion to be rotated, and
wherein the waist belt passes through and is connected to the buckle portion.

7. The safety belt device configured for the vehicle of claim 6,
wherein the first extension portion has a first gear groove formed thereon and extending in a longitudinal direction thereof, and
wherein the first webbing moving portion is provided with a first up-down moving motor which is engaged with the first gear groove to be moved along the first gear groove in a rotating operation of the first up-down moving motor.

8. The safety belt device configured for the vehicle of claim 6, wherein the first webbing rotation portion includes:
a first rotary motor selectively movable along with the first webbing moving portion; and
a first rotary plate around which the buckle portion is coupled, and
wherein the first rotary motor passes through and is coupled to a center of the first rotary plate.

9. The safety belt device configured for the vehicle of claim 6, further including:
a first housing formed to cover the first webbing moving portion and the first webbing rotation portion,
wherein the first webbing moving portion and the first webbing rotation portion are coupled to the first housing to allow the first webbing rotation portion to be moved with the first webbing moving portion.

10. The safety belt device configured for the vehicle of claim 2,
wherein the second moving mechanism includes:
a second front and rear moving device slidably disposed on a second guide portion extending in the first predetermined direction along a seat rail; and
a second up-down moving device disposed to be moveable in the second predetermined direction thereof on the second front and rear moving device, and
wherein the second moving mechanism further includes:
a webbing guide which is detachably disposed on a tongue provided on the waist belt and is configured to be detached from the tongue when the second up-down moving device is moved and coupled, and
wherein the waist belt passes through and is connected to the webbing guide.

11. The safety belt device configured for the vehicle of claim 10,
wherein the second front and rear moving device includes a second sliding portion slidable on the second guide portion and a second extension portion extending upwards from the second sliding portion, and
wherein the second up-down moving device is moveably disposed on the second extension portion.

12. The safety belt device configured for the vehicle of claim 11,
wherein the second guide portion and the second sliding portion are screw-coupled to each other, and
wherein the second guide portion receives a power from a second driving motor provided on the seat rail or a bottom surface of the vehicle and is then rotated to allow the second sliding portion to be moved along the second guide portion.

13. The safety belt device configured for the vehicle of claim 11, wherein the second up-down moving device includes:
a second webbing moving portion disposed to be movable in the second predetermined direction thereof along the second extension portion; and
a second webbing rotation portion configured to be moved with the second webbing moving portion and to be coupled to the webbing guide when moved upward.

14. The safety belt device configured for the vehicle of claim 13,
wherein the second extension portion has a second gear groove formed thereon and extending in a longitudinal direction thereof, and
wherein the second webbing moving portion is provided with a second up-down moving motor which is engaged with the second gear groove to be moved along the second gear groove in a rotating operation of the second up-down moving motor.

15. The safety belt device configured for the vehicle of claim 13,
wherein the second webbing rotation portion includes:
a second rotary motor configured to be moved along with the second webbing moving portion; and
a second rotary plate on which a guide tongue inserted into and coupled to the webbing guide is formed, and
wherein the second rotary motor passes through and is coupled to a center of the second rotary plate.

16. The safety belt device configured for the vehicle of claim 15,
wherein a hook portion engageably connected to the webbing guide is rotatably disposed on the tongue of the waist belt, an insertion hole which into the guide tongue is inserted and an engaging recess to which the hook portion is engageably connected are formed on the webbing guide, and the hook portion includes a hook bar and a guide bar, and
wherein the hook bar is rotatably disposed on the tongue and the guide bar extends from the hook bar to be placed in the insertion hole when the hook bar is inserted into the engaging recess.

17. The safety belt device configured for the vehicle of claim 10, further including:
a second housing formed to cover the second webbing moving portion and the second webbing rotation portion,
wherein the second webbing moving portion and the second webbing rotation portion are coupled to the second housing to allow the second webbing rotation portion to be moved with the second webbing moving portion.

18. The safety belt device configured for the vehicle of claim 1, wherein the belt driving device includes:
rotation bars provided on a first side and a second side of the seat, respectively, a first end portion of each of the rotation bars being rotatably disposed at a front side of the seat with respect to a rotation axis thereof and a second end portion being provided with a guide buckle to which the waist belt is connected; and
an actuator disposed on the seat to be connected to the rotation axis of the rotation bars and transmitting a rotational power to rotate the rotation bars with respect to the rotation axis.

19. The safety belt device configured for the vehicle of claim 18, wherein the guide buckle is rotatably disposed on the second end portion of the rotation bars.

20. The safety belt device configured for the vehicle of claim 1,
wherein arm rest holders are provided on a first side and a second side of the seat, and
wherein each arm rest holder extends on a path along which the waist belt is moved by the belt driving device, and surrounds the belt driving device to not be exposed to an outside thereof.

* * * * *